3,467,193
METHOD FOR ACHIEVING TURBULENCE IN CEMENTING WELLS
Joseph U. Messenger, Dallas, Tex., assignor to Mobil Oil Corporation, a corporation of New York
No Drawing. Filed Apr. 4, 1966, Ser. No. 539,752
Int. Cl. E21b 33/138
U.S. Cl. 166—292      9 Claims

ABSTRACT OF THE DISCLOSURE

This disclosure relates to cement compositions and cementing operations carried out in wells penetrating subterranean formations. More particularly, it relates to cement slurries and methods for cementing casing in a well penetrating substerranean formations. The cement compositions used herein include minor amounts, respectively, of a turbulence inducer and silica or diatomaceous earth particles having a size range between about 0.1 and 44 microns in effective diameter. The properties of the disclosed composition allow the cement slurry to be flowed in turbulence at relatively low flow rates during emplacement thereof.

---

For various purposes, wells are drilled from the surface of the earth to subterranean formations. Thus, for example, wells are drilled to subterranean formations to produce and recover fluids such as water, gas, or oil from the formations.

In order to prevent entry into the well of a fluid from a formation other than the desired productive formation after the well has been completed, the well is usually provided with a casing extending from the surface to at least the desired productive formation. The casing is cemented in place. Sometimes, a liner is cemented in place at the productive formation. A liner is simply a special kind of casing, generally covering a shorter interval. Therefore, the term casing is employed herein to include liners. After the casing has been placed in the well cementing is effected by pumping a cement slurry, downward through the casing and thence upward from the bottom of the casing where possible, through the annulus between the outer surface of the casing and the surrounding wall of the well. Pumping through the annulus is stopped to emplace the cement slurry between the casing and the wall of the well. The cement is allowed to set. The cement thus forms an impermeable sheath bonding the casing to the wall. It is important that at least the bottom end of the casing in the well, commonly called the shoe, be adequately bonded to the wall of the well. The bonding of the casing in the region of the productive formation must prevent fluid communication with other formations. After the cement has set, the casing and the cement sheath in the annulus are usually perforated to the productive formation. Thus, fluid can pass from the productive formation into the casing, but fluids from other formations cannot pass into the casing.

To be satisfactory for these operations, the cement must have adequate strength, generally measured as compressive strength. A compressive strength of at least 300, and preferably at least 500, pounds per square inch is required to be satisfactory.

In the past, in a large portion of the wells so completed the cement did not effect an impermeable bond between the casing and the wall of the well. Thus, fluids were able to migrate from other formations into the productive formation or vice versa. Such poor cement jobs required expensive reworking, called squeeze jobs.

It has been recognized that a contributing factor to poor cement jobs was the drilling fluid filter cake remaining on the wall of the well following the drilling operation. Attempts have been made to wash the filter cake from the wall of the well prior to the cementing operation. However, the liquids employed in these attempts often caused reduced permeability in the productive subterranean formation.

Further, it has been found that flowing the cement slurry in turbulence during emplacement thereof removes displaceable filter cake, effects a higher percentage of good cement jobs, and minimizes the number of squeeze jobs required. However, it has been impractical to achieve turbulent flow of the usual cement slurry and still maintain adequate consistency or apparent viscosity—quantipoint.

tatively characterizable by plastic viscosity and yield

The plastic viscosity of a cement slurry is the slope of the curve of shear stress plotted against shear rate. It is well known in the art of drilling fluids. On the other hand, the use of yield point in measuring rheological properties of cement slurries may not be quite so well known. It is theorized that the plastic viscosity of a cement slurry is determined primarily by the size, shape, and number per unit volume of particles it contains.

The yield point of a cement slurry is the intercept of the curve of shear stress plotted against shear rate with the axis on which the shear stress is plotted. It is theorized that the yield point of a cement slurry is determined primarily by the charges on the molecules and the particles, and the configurations which the agglomerating molecules and particles assume in the slurry.

In general, these properties of the cement slurry are controlled as follows. The plastic viscosity is reduced primarily by adding water to the cement slurry. The water also lowers the yield point, although to a lesser extent. On the other hand, the yield point of a slurry is reduced primarily by adding turbulence inducers. The turbulence inducers also lower plastic viscosity, although to a much less extent than they lower the yield point.

To be pumpable in turbulence in setting casing in most wells, yet afford a satisfactory, substantially homogeneous set cement, a cement slurry should have the lowest possible plastic viscosity which allows retaining adequate yield point. Specifically, a cement slurry should have a plastic viscosity of less than about 35 centipoises and a yield point in the range of from about 0.1 to about 3 pounds per one hundred square feet. Lower values of yield points indicate there will be settling of solids in the cement slurry.

Achieving turbulent flow with a conventional cement slurry of high apparent viscosity presents problems not normally encountered in flow of less viscous Newtonian fluids. Before turbulence inducers were developed, to flow the cement slurry in turbulent flow by control of flow rate alone required, even in shallow wells, additional capacity in the pumping equipment and dangerously high pressures compared to nonturbulent flow. In deep wells the pressure required to pump the cement slurry fast enough to achieve turbulence exceeded the pressure at which many subterranean formations broke down, resulting in lost circulation problems. Infrequently, the pressure required would have exceeded the pressure limitations of the surface equipment or the casing placed in the well. To allow the cement slurry to be pumped in turbulence at lower rates of flow, turbulence inducers have been added to the cement slurry. For the same reason, water also has been added to a cement slurry. Each of these added materials lowers the yield point of the cement slurry. The solids in the cement slurry tend to settle out too rapidly when the yield point is too low, particularly when it has a negative value. When either turbulence inducer or water has been employed in the desired concentration range, it has not been possible, heretofore, to employ the other in the desired concentration without danger of the solids settling out of the cement slurry. If both were employed in a cement slurry, any interruption of pumping during cementing with such a cement slurry, such as caused by mechanical failure, has resulted in the solids falling to the bottom of the well and in the cement prematurely settling there. Even in normal cementing operations, the set cement is not homogeneous and often lacks adequate strength.

In accordance with the present invention there are provided new and improved methods of cementing casing within a well employing a cement slurry which may be flowed in turbulence at relatively low flow rates. The cement slurry used in carrying out the invention comprises hydraulic cement, water, turbulence inducer in an amount within the range of 0.1 to 2.0 percent by weight based upon the amount of hydraulic cement present, and silica or diatomaceous earth particles having sizes within the range of 0.1 to 44 microns in diameter and present in an amount within the range of 0.5 to 10.0 percent by weight based upon the amount of hydraulic cement present. The cement slurry is emplaced between the casing and the wall of the well.

I have found that a cement slurry formed by admixing the cement composition; comprising hydraulic cement, a minor amount of turbulence inducer, and a minor amount of silica or diatomaceous earth particles having sizes of from about 0.1 to about 44 microns in diameter; with water retains an adequate yield point to minimize settling of solids therein yet may be pumped in turbulence at lower rates of flow than previously formed cement slurries of comparable yield point. The adequate yield point retention effects a satisfactory, substantially homogeneous set cement. Expressed another way, the silica or diatomaceous earth particles effect retention of the solids in a dispersed state in the cement slurry in the presence of larger concentrations of water with a given concentration of turbulence inducer.

In effecting a cement slurry which has the desired yield point and plastic viscosity yet sets to form a satisfactory, substantially homogeneous cement, the sizes of the silica or diatomaceous earth particles are critical. The best range of sizes can be determined from empirical observations, e.g., as obtained by employing the Fann VG Meter as described hereinafter, on the particular cement slurry which is to be pumped in the well. The following general guidelines have been found useful. Particles having effective diameters of from about 0.1 to about 44 microns are beneficial in various cement slurries containing turbulence inducer. Particles having effective diameters of from about 1 to about 15 microns are particularly effective and may be employed without careful attention to concentration. Particles having effective diameters which predominate at about 5 microns are most preferred. Particles having diameters less than about 1, and larger than 0.1, micron require careful attention to the concentration employed to prevent effecting an intolerably high apparent viscosity.

By silica is meant silicon dioxide, $SiO_2$, as defined in the Condensed Chemical Dictionary, Sixth Edition, Arthur and Elizabeth Rose, Reinhold Publishing Company, New York, 1956, page 1017. The silica particles employed in the invention are found in the fines which are often by-products passing through a No. 325 screen, U.S. Sieve Series. A particular range of particle sizes may be prepared by known pulverizing and sizing techniques, e.g., by roll mill and air separation. The sizes employed are commercially available.

By diatomaceous earth is meant diatomite as defined by the Condensed Chemical Dictionary, ibid., pages 353 and 354. When the soft, diatomaceous earth rock is pulverized, very small-sized particles of siliceous skeletons of diatoms result, e.g., down to 0.1 micron in diameter. Thus, air separators or air classifiers enable achieving the desired particle sizes readily. The sizes employed in the invention are also commercially available.

In the practice of the invention, any type of hydraulic cement may be employed. By hydraulic cement is meant a cement which will set under the action of water. Preferably, portland cement is used. However, any mixture containing lime, silica, and alumina, and commonly used as a hydraulic cement, is satisfactory. Where portland cement is used, it may be any type heretofore regarded in the cementing art as portland cement. By portland cement is meant that composition defined in the Condensed Chemical Dictionary, Hackh's Chemical Dictionary, or other standard reference works. The precise composition varies from one portland cement to another. Portland cement is made by mixing and grinding a calcareous material with an argillaceous material and heating the mixture in a kiln to a temperature in the range of 1350° to 1800° C. until it begins to vitrify. The clinker thus produced is pulverized and mixed with a small amount of gypsum. The portland cement may be ground to any desired particle size.

Normal grinding and sieving operations in preparing cement produce particle having a specific surface in the range of 1,200 to 2,600 square centimeters per gram. The various cements currently employed are graded by the specific surface area and by the amount of particle sizes which are retained on a No. 325 screen, U.S. Sieve Series. For example, the high early strength cements have a specific surface in the range of from about 2,200 to about 2,600 square centimeters per gram and 95 to 100 weight percent of the particles passes through the No. 325 screen. On the other hand, Class A portland cement has a specific surface area of about 1780 square centimeters per gram and about 90.4 weight percent passes through a No. 325 screen. Oil well cements have a specific surface of about 1482 square centimeters per gram and about 84.9 weight percent passes through a No. 325 screen.

When cementing operations are carried out in a well at temperatures in excess of about 200° F., it is preferable to employ an oil well cement, which is a type of portland cement admixed with a minor portion, e.g., from about 0.05 to about 2.0 percent by weight, of a retarder. It may be ground more coarsely and contain less tricalcium aluminate. Illustrative retarders which may be mixed with the portland cement are carboxymethylhydroxyethylcellulose, borax, dehydrated borax, or the lignosulfonate compounds such as calcium lignosulfonate or ferrochrome lignosulfonate. Such oil well cements are commercially available.

Inert additives such as weighting components like barite or ilmenite may be admixed with the cement if desired. For example, to prevent strength retrogression at high temperatures, silica may be added in the usual amounts. While the usual amounts have been described as 10 to 75 percent by weight of the hydraulic cement, it has been found that generally more than 20 percent by weight is required to be effective in preventing strength retrogression at high temperatures.

Any of the known turbulence inducers may be employed in the compositions or methods of the invention. The turbulence inducer may be organic molecules which are ionic enough in character or adsorb strongly enough to effect a reduction in the yield point of the cement slurry. Suitable turbulence inducers are water-soluble alkyl aryl sulfonates, polyphosphates, lignosulfonates, lactones and gluconates, synthetic polymers, and organic acids. More specific chemical compounds which are illustrative are sodium dodecyclbenzenesulfonate, sodium hexametaphosphate, calcium lignosulfonate, γ-butyrolacgluconic acid, sodium polystyrenesulfonate, and oleic acid. The ammonium salts, as well as the other alkali metal salts, may be employed in the place of the named sodium salts as turbulence inducers also. Suitable turbulence inducers which are sold for that purpose by oil well servicing companies include the following Dowell's TIC series and Halliburton's CFR series:

TIC-2 _____ Anhydrous citric acid.
CFR-1 _____ d-glucono delta lactone.
TIC-1 and CFR-2 _____ Condensed alkyl naphthalene sulfonates.

In the condensed alkyl naphthalene sulfonates, it is preferred that the alkyl groups contain at least about 6 carbon atoms and no more than about 13 carbon atoms.

The water which is employed with the cement composition to form a cement slurry may be any dilute aqueous solution conventionally employed in mixing cement slurries. Brines of any concentration of calcium chloride, sodium chloride, or mixtures thereof may be employed. Sea water may be employed and is particularly advantageous in offshore operations.

Unless otherwise noted, all concentrations given herein are based on the amount of the hydraulic cement present. For convenient reference, the basis is repeated in various sections.

In practice of the invention, a concentration of turbulence inducer is employed which will enable the cement slurry, in corporating the cement composition, to be pumped in tubulence in cementing operations carried out under a given set of conditions. In this regard, the following guidelines have been found helpful in delineating the concentration which is most effective. A concentration of at least 0.1 percent by weight of turbulence inducer is usually required to effect significant reduction in yield point. As a general rule, no more than about 2.0 percent by weight of turbulence inducer is employed because of the adverse effects on the settling of solids from the cement slurry, on the setting of the cement, and on the compressive strength of the set cement.

A concentration of silica or diatomaceous earth particles having sizes of from about 0.1 to about 44 microns in diameter is employed which will effect the desired plastic viscosity and yield point in the cement slurry incorporating the cement composition. Usually, a concentration of at least 0.5 percent by weight, based on the amount of hydraulic cement present, of the silica particles or the diatomaceous earth particles is required in the cement slurry to effect the desired low plastic viscosity and the desired low but positive yield point without causing undue settling of the solids therefrom. Very small changes in concentration of slica or diatomaceous earth particles having a diameter of from about 0.1 to about 1.0 micron may effect large changes in plastic viscosity of the cement slurry. Such disproportionate change are most likely at concentrations greater than from about 1.5 to about 2.0 percent by weight. Usually, therefore, no greater concentration than about 2.0 percent by weight is employed when such small particles are used. Concentrations within the range of from about 0.5 to about 10.0 percent by weight are suitable when the silica or diatomaceous earth particles have diameters between 1 and 15 microns. A preferred concentrations is 5 percent by weight of such silica particles or such diatomaceous earth particles. In general, concentrations greater than about 10 percent by weight are undesirable and effect an increased plastic viscosity, even with the higher concentrations of water, as described hereinafter.

Water is employed in an amount adequate to effect a pumpable slurry from the cement composition yet not so large as to cause a weak or inhomogeneous set cement as by settling of aggregate or water pockets. The maximum and minimum amounts of water are described in a bulletin, API RP 10B, Twelfth Edition, March 1963, entitled "API Recommended Practice for Testing Oil-Well Cements and Cement Additives," by American Petroleum Institute, New York, N.Y., Division of Production, Dallas 1, Tex., 1963, section 3, page 6. As described therein at paragraph 3.3, Minimum Water Procedure, an amount of water is employed which will provide a cement slurry having a maximum consistency of 30 poises in a Halliburton thickening-time tester. Normally, an amount of water is employed which will afford a consistency of about 11 poises. While increasing the water content effects a lower plastic viscosity and a cement slurry which is more readily pumped in turbulent flow, no more water is employed than that which will provide 4.0 milliliters of supernatant water in a 250-milliliter sample of cement slurry after standing quiescent in a 250-milliliter graduated cylinder for a period of two hours, as described in paragraph 3.1 of API RP 10B. Preferably, no more water is employed than that which provides 2.5 milliliters of supernatant water in the test. The amount of water which may be employed in a cement slurry will depend to some extent upon the type of hydraulic cement employed. In high temperature environments, e.g., above 250° F., the silica added to prevent strength retrogression requires additional water. Hence, under such circumstances, the concentrations of water given herein are based on the weight of cement and the added silico. Usually, an amount of at least 27 percent by weight of water is required to achieve a slurry pumpable in turbulence. Although the maximum amount of water depends to a great extent on the type of cement, usually an amount no greater than 65 percent by weight is employed. Table I gives the percent of water ordinarily employed in mixing the cement slurry for cementing casing in a well.

TABLE I.—WATER REQUIREMENTS
[Basis described above]

| Cement | Class | Weight percent |
| --- | --- | --- |
| Portland | A | 46 |
| Oil well | E | 38 |
| High early strength | C | 56 |

In certain special lightweight cements containing clay, water up to as high as 115 percent by weight is employed. Heretofore, the concentrations of water listed in Table I, or higher ones, could not be employed in a cement slurry containing an effective concentration of turbulence inducer without danger of settling of particles.

Another factor which additionally determines the amount of water employed is the density of the cement slurry. Ordinarily, the cement slurry has a density at least as great as the drilling fluid employed in drilling the well. An amount of water less than the amount ordinarily employed may be used to create a densified cement slurry. A densified cement slurry is a slurry made from essentially the same dry cement composition but which has a density of at least 1 pound per gallon more than the comparable cement slurry employing larger concentrations of water. Such densified cement slurries set to form cements having unusually high compressive strengths.

In the following embodiment, cementing operations are described in general terms. Modifications which are conventionally employed, e.g., for cementing liners in a well, may be employed, with or without reversing out excess cement, and still incorporate the essential features of the method of the invention. These essential features are: (1) the preflush with the productive formation water containing dispersant, (2) followed by a spearhead of cement slurry easily flowed in turbulence, and (3) followed by and emplacing about the shoe of the casing in the well and at least over the interval of the productive formation a tail portion of a densified cement less readily flowed in turbulence but affording greater structural strength; in each cement slurry embodying a quantity of a turbulence inducer cooperating with a particular quantity of silica or diatomaceous earth particles having sizes of from about 0.1 to about 44 microns in diameter to allow using larger concentrations of water without excessive settling of solids.

Specifically, the particular embodiment of the invention for cementing casing in a well comprises the following multiple steps.

Firstly, the casing to be cemented in the well is placed in the well in the conventional manner, forming an annular space between the casing and the wall of the well. Desirably, all flow through the annular space is upward. Then, through this annular space there is flushed a preflush of formation water containing from about 0.1 to about 2.0 percent by weight of water of dispersants. Formation water denotes water from the productive formation since that is the subterranean formation in which reduction in permeability is undesirable. Suitable dispersants are sodium dodecylbenzenesulfonate, sodium acid pyrophosphate, tetrasodium pyphosphate, nonionic surfactants such as nonyl phenol in association with 10 to 30 mols of ethylene oxide per mol of nonyl phenol, or mixtures of these compounds. The preflush of formation water containing the dispersant loosens and removes the drilling fluid filter cake which will have formed on the wall of the well, particularly at permeable subterranean formations. Yet, the formation water does not cause undesirably reduced permeability because it does not have reduced salinity to cause clay swelling. Neither does it contain incompatible chemicals to form precipitates upon contact with the in-situ water in the productive formation.

Secondly, the preflush of treated formation water and loosened drilling fluid filter cake are driven through the annular space by flowing therebehind a spearhead of cement slurry comprising portland cement, at least 38 percent by weight of water, 0.1 to 2.0 percent by weight of turbulence inducer, and 0.5 to 10.0 percent by weight of silica or diatomaceous earth particles having sizes of from about 0.1 to about 44 microns in diameter. The spearhead of cement slurry is at least as dense as the drilling mud employed in drilling the well. Preferably, it has a density which is higher by 1 pound per gallon. Preferably, also, the major portion of the casing in the well is cemented with this spearhead of cement slurry. The quantity of cement slurry employed in this spearhead of cement slurry varies with the particular well and casing being cemented therein. A small diameter casing in a large diameter well requires larger quantities of cement than a large diameter casing in the same well. Deeper wells of comparable completion structure require greater quantities of cement than do shallow wells. The spearhead of cement slurry may require, for example, from about 40 to about 2,500 sacks, or more, of cement.

Thirdly, the spearhead of cement slurry is displaced through the annular space by flowing therebehind a tail portion of cement slurry which is densified so that it weighs at least 1 pound per gallon more than the spearhead cement slurry. This tail portion of cement slurry comprises portland cement, at least 27 percent by weight of water, 0.1 to 2.0 percent by weight of turbulence inducer, and 0.5 to 10.0 percent by weight of silica or diatomaceous earth particles having sizes of from about 0.1 to about 44 microns in diameter. This tail portion of densified cement slurry is emplaced about the shoe of the casing in the well and occupies at least the interval of the annular space covering the productive formation. The quantity of cement slurry employed in this tail portion of cement slurry varies with the particular formation into which the casing is being cemented. Thicker formations require greater quantities of cement to cement the proportionally longer interval of annular space. Typically, this tail portion of densified cement slurry requires from about 25 to about 200 sacks of cement.

Finally, the cement slurries are then allowed to set in place.

The following example further illustrates the invention and its advantages. For convenient measurement and determination of plastic viscosity and yield point in this example, a two-speed Fann VG Meter was employed. The values of plastic viscosity and yield point are those determined by measurements made at 300 and 600 revolutions per minute on the Fann VG Meter. The plastic viscosity is the difference between the readings of the Fann VG Meter at the 300-r.p.m. and the 600-r.p.m. rate. The yield point is determined by subtracting the plastic viscosity from the reading of the Fann VG Meter at 300 r.p.m.

EXAMPLE

In this example, Texcor cement was admixed with ground silica purchased from Halliburton Company and passing No. 100 screen, U.S. Sieve Series; Dowell's TIC-2 turbulence inducer; Dowell's D28R retarder, water-soluble lignosulfonates; Dowell's D-46 defoamer, a mixture of the well-known polyglycols; and a sodium chloride-saturated brine to form two cement slurries, a control slurry and slurry No. 1. The proportion of ingredients in both the control slurry and slurry No. 1 was as follows. Six hundred grams of Texcor cement were admixed with 0.5 percent by weight of turbulence inducer, 0.2 percent by weight of retarder, 0.2 percent by weight of defoamer, and 40 percent by weight of brine. The plastic viscosity and yield point were determined at a temperature of only 150° F. Therefore, the concentration of brine was based on weight of cement alone and not on the weight of cement and silica. Into the control slurry, 35 percent by weight of the 100-mesh silica was admixed. Into slurry No. 1, 30 percent of the 100-mesh silica was admixed and 5 percent of silica particles having a predominant size of 5 microns effective diameter, and having a distribution of particle sizes between about 1 and about 15 microns in diameter was admixed therewith. Table II summarizes the data obtained with the control slurry and with slurry No. 1.

TABLE II

| Slurry properties | Control slurry | Slurry No. 1 |
|---|---|---|
| Density, lb./gal | 16.0 | 16.1 |
| API Filter Loss, cc./sec.: | | |
| At 850 p.s.i. and 200° F | 54/60 | 55/115 |
| At 850 p.s.i. and 300° F | 160/120 | 148/167 |
| Plastic voscosity at 150° F. (centipoises) | 37 | 31 |
| Yield point at 150° F. (lb./100 sq. ft.) | −6 | 1 |

As shown in Table II, slurry No. 1 has a lower filter loss than the control slurry, and a lower plastic viscosity at 150° F. Of most significance, however, is the increased yield point. Slurry No. 1, having a yield point of 1 pound per 100 square feet, could be pumped into a well and emplaced with minimal risk of premature settling of solids; whereas the control slurry, with its yield point of −6 pounds per 100 square feet, could not since the negative value indicates settling even during the test.

The invention provides a well cementing method for their employment which enables achieving a higher percentage of good cement jobs when cementing casing in a well penetrating subterranean formations. Particularly, the cement slurry retains an adequate yield point and yet map be pumped in turbulence at lower rates of flow than have been heretofore possible with cement slurries of comparable yield points. In the specific embodiment, the invention provides a method of cementing casing in a well penetrating subterranean formations which washes the drilling mud filter cake from the wall of the well without reducing the permeability of the productive subterranean formation, which effects turbulent flow of the cement slurry having an adequate yield point, which bonds the casing to the wall of the well with an impermeable bond of substantially homogeneous cement, and which provides a bond about the shoe of the casing and at least over the interval of the productive formation with a homogeneous densified cement having a high compressive strength when set.

Having thus described the invention, it will be understood that such description has been given by way of illustration and example and not by way of limitation, reference for the latter purpose being had to the appended claims.

What is claimed is:
1. In a method of cementing, with a cement slurry containing hydraulic cement and water, casing in a well penetrating subterranean formations, the improvement comprising adding to said cement slurry 0.1 to 2.0 percent by weight of turbulence inducer and 0.5 to 10.0 percent by weight of silica or diatomaceous earth particles having sizes of from about 0.1 to about 44 microns in diameter, said percents by weight being based on the amount of hydraulic cement present, and emplacing said cement slurry between said casing and the wall of said well.
2. A method for cementing casing in a well penetrating subterranean formations which comprises the steps of:
  (a) placing said casing in said well, thus forming an annular space between said casing and the wall of said well;
  (b) flowing in turbulence through said annular space a preflush treatment of formation water containing a dispersant;
  (c) flowing in turbulence behind said formation water a spearhead of cement slurry comprising portland cement, at least 38 percent by weight of water but no more than the amount effecting satisfactory, substantially homogeneous cement, 0.1 to 2.0 percent by weight of turbulence inducer, and 0.5 to 10.0 percent by weight of silica or diatomaceous earth particles having sizes of from about 0.1 to about 44 microns in diameter;
  (d) flowing in turbulence through said annular space behind said spearhead of cement slurry, a tail portion of cement slurry which is densified so that it weighs at least one pound per gallon more than said spearhead of cement slurry and comprising portland cement, at least 27 percent by weight of water and less than said spearhead of cement slurry, 0.1 to 2.0 percent by weight of turbulence inducer, and 0.5 to 10.0 percent by weight of silica or diatomaceous earth particles having sizes of from about 0.1 to about 44 microns in diameter; and
  (e) stopping said flow so as to emplace said tail portion of densified cement slurry about the shoe of said casing in said well and at least over the interval of the productive formation and holding said cement slurries in said well until said cement slurries have set, said percents by weight being based on the amount of portland cement present.

3. The method of claim 2 wherein said silica or diatomaceous earth particles have a predominant distribution of sizes of from about 1 to about 15 microns in diameter.

4. The method of claim 2 wherein said silica or diatomaceous earth particles have a predominant size of about 5 microns in diameter and a distribution of sizes of from about 1 to about 15 microns in diameter.

5. The method of claim 2 wherein said silica or diatomaceous earth particles are present in a concentration of from 0.5 to 5.0 percent by weight.

6. The method of claim 1 wherein said silica or diatomaceous earth particles have a predominant distribution of sizes of from about 1 to about 15 microns in diameter.

7. The method of claim 1 wherein said silica or diatomaceous earth particles have a predominant size of about 5 microns in diameter and a distribution of sizes of from about 1 to about 15 microns in diameter.

8. The method of claim 1 wherein said silica or diatomaceous earth particles are present in a concentration of from 0.5 to 5.0 percent by weight.

9. The method of claim 1 wherein said silica or diatomaceous earth particles are present in a concentration of from 0.5 to 2.0 percent by weight.

References Cited
UNITED STATES PATENTS

| | | | |
|---|---|---|---|
| 2,233,973 | 3/1941 | Dunn | 106—89 |
| 2,410,954 | 11/1946 | Sharp | 106—98 |
| 2,585,366 | 2/1952 | Bollaert et al. | 106—98 |
| 2,805,719 | 9/1957 | Anderson | 166—29 |
| 3,053,673 | 9/1962 | Walker | 166—31 X |
| 3,071,481 | 1/1963 | Beach et al. | 166—31 X |
| 3,219,112 | 11/1965 | Sauber et al. | 166—31 |

STEPHEN J. NOVOSAD, Primary Examiner

U.S. Cl. X.R.
166—294